United States Patent [19]

Slutz et al.

[11] Patent Number: 5,026,960
[45] Date of Patent: Jun. 25, 1991

[54] CHIP BREAKER FOR POLYCRYSTALLINE CBN AND DIAMOND COMPACTS

[75] Inventors: David E. Slutz, Columbus; Friedel S. Knemeyer, Granville, both of Ohio

[73] Assignee: The General Electric Company, Worthington, Ohio

[21] Appl. No.: 429,661

[22] Filed: Oct. 31, 1989

[51] Int. Cl.⁵ .............................................. B23H 9/00
[52] U.S. Cl. .................... 219/69.17; 51/307; 219/121.69; 407/114; 407/115
[58] Field of Search .......... 219/69.17, 121.68, 121.69, 219/68, 69.1, 69; 83/869, 39, 40, 50; 407/6, 114, 115, 116, 119; 51/307, 325

[56] References Cited

U.S. PATENT DOCUMENTS

| | | | |
|---|---|---|---|
| 3,990,329 | 11/1976 | Laurin | 407/114 |
| 4,087,193 | 5/1978 | Mundy | 407/114 |
| 4,335,295 | 6/1982 | Fowler | 219/121.69 |
| 4,387,287 | 6/1983 | Marazzi | 219/69.17 |
| 4,481,016 | 11/1984 | Campbell et al. | 51/307 |
| 4,525,179 | 6/1985 | Gigl | 51/307 |
| 4,533,812 | 8/1985 | Lorenz | 219/121.68 |
| 4,629,373 | 12/1986 | Hall | 51/307 |
| 4,650,776 | 3/1987 | Cerceau et al. | 51/307 |
| 4,702,649 | 10/1987 | Komanduri | 51/307 |
| 4,755,237 | 6/1988 | Lemelson | 219/121.69 |
| 4,793,220 | 12/1988 | Yamamoto et al. | 219/69.17 |
| 4,854,784 | 8/1989 | Murray et al. | 407/114 |

Primary Examiner—Geoffrey S. Evans
Attorney, Agent, or Firm—Mueller and Smith

[57] ABSTRACT

An oversize compact blank having a surface and edges that establish it as oversized is provided. A chip breaker pattern is formed on the compact blank surface. Preferred means for forming the chip breaker pattern include use of a laser, a plunge EDM apparatus, or by ultrasonic abrading. Thereafter, the edges of the patterned oversized compact blank are finished to reduce the size of the blank. When pluge EDM apparatus fitted with a patterned plunger is used, the compact blank must be electrically conductive.

6 Claims, 1 Drawing Sheet

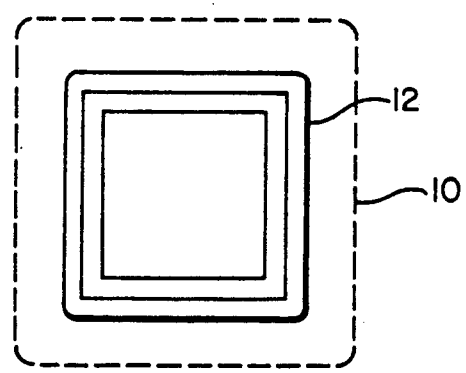

CHIP BREAKER FOR POLYCRYSTALLINE CBN AND DIAMOND COMPACTS

BACKGROUND OF THE INVENTION

The present invention relates to the production of superabrasive cutting blanks and more particularly to enhancing chip control by such blanks.

In turning operations on metals, a ribbon-like strip of metal is removed from the workpiece. The strip or ribbon is cut off from the workpiece at the edge of the cutting insert. Control of this ribbon of metal is important for a number of reasons. In this regard, such strips of material also result from drilling operations, for example in mining applications. Chip control in these non-metal operations also is important.

If the strip taken off from the workpiece by the cutting insert is not broken up, the strip can feed into the tool holder or other portions of the machine and cause difficulties, e.g. damaging parts of the tool holder or obstructing visibility of the working area. Further, long ribbons are difficult to handle and can represent a safety hazard to the machine operator in metal turning operations.

Preferably, the strip taken off of the workpiece is caused to break-up into short pieces or chips which will readily fall away from the machining region into a receiving space or containers so that the chips are contained and can be removed from the machine tool. In drilling operations, chip removal is important so that drilling efficiency and tool insert damage does not result.

In metal turning operations utilizing cemented tungsten carbide inserts, chip breaker grooves or lands have been proposed in the art. Such chip breaker patterns on the carbide blank are provided during the blank molding operation. In this regard, reference is made to the following: U.S. Pat. Nos. 3,733,664, 3,973,307, 4,087,193, and 4,214,845, and British patent applications Nos. 51899 and 51968.

What is lacking in the art is the ability to provide chip breaker patterns on the surface of superabrasive compacts typified by polycrystalline diamond and CBN compacts.

BROAD STATEMENT OF THE INVENTION

The present invention is directed to the formation of a chip breaker in a polycrystalline diamond or cubic boron nitride compact. An oversized compact blank having a surface and edges that establish it as oversized is provided. A chip breaker pattern is formed on one or both surfaces of the compact blank. Preferred means for forming the chip breaker pattern include use of a laser, a plung EDM apparatus, or by ultrasonic abrading. Thereafter, the edges of the patterned oversized compact blank are finished to reduce the size of the blank. When plunge EDM apparatus fitted with a patterned plunger is used, the compact blank must be electrically conductive.

Advantages of the present invention include the ability to provide a variety of chip breaker patterns on cutting inserts that heretofore have not benefitted from chip breaker technology. Another advantage is the discovery of specific techniques that can be implemented at commercial scale operations. Yet another advantage is the expected chip control that should be realized by use of the patterned cutting blanks of the present invention. These and other advantages will be readily apparent to those skilled in the art based upon the disclosure contained herein.

BRIEF DESCRIPTION OF THE DRAWING

The drawing is a plan view of a CBN compact with a chip breaker pattern formed therein from an oversize compact blank.

The drawing will be described in detail below.

DETAILED DESCRIPTION OF THE INVENTION

CBN compacts and polycrystalline diamond compacts are made by high pressure/high temperature (HP/HT) processes known in the art. Such processing conditions militate against formation of detailed patterns on surfaces of the compact blanks being made. This is especially true considering that grinding and finishing operations of the compact blanks are an accepted post-production procedure implemented in commercial scale operations. Thus, unlike cemented carbide inserts, chip breaker patterns apparently have not found their way into the superabrasive art due to expected difficulties in providing chip breaker patterns on the surfaces of the compact blanks.

Work on the present invention has revealed that compact blanks having at least one surface can be subjected to certain processes that enable chip breaker patterns to be formed on such surface. As a practical matter, however, the cutting blanks should be oversized prior to formation of the chip breaker pattern thereon. By "oversize" is meant that the edges of the compact extend beyond the edge that later will be established in the final cutting blank or insert. After the chip breaker pattern has been formed, the oversize edges can be finished to produce a chip breaker superabrasive compact blank or cutting insert of the desired size. In at least one operation, use of the oversize cutting blank has been found necessary since the operation results in edge chipping. As a practical matter, however, economy and efficiency during manufacturing operations lead the manufacturer to form the pattern on the surface of the blank prior to subjecting the edges of the pattern oversized cutting blank to finishing to reduce the size thereof.

The drawing shows an oversize CBN compact in phantom at 10 and which has been finished to exhibit final outer edge 12. Chip breaker pattern 14 has been formed by a YAG laser and provides chip control during use of the cutting blank.

One technique discovered for implementation of the chip breaker pattern on the surface of the compact blank comprises the use of a laser, and preferably a Lasag YAG laser which has sufficient output energy capability for removing diamond and CBN material form the compact blank surface for establishing the chip breaker pattern thereon. Use of the Lasag laser, however, resulted in severe edge chipping, as described above. Thus, the use of an oversize compact blank when forming the chip breaker pattern by means of a laser distinctly should be employed. The depth of cut can be controlled rather well using the Lasag laser. By moving the focal point well above the surface, the cut broadens. Defocusing the beam also broadens the cutting beam to make wider cuts.

Another technique that has been successfully employed in forming a chip breaker pattern on the surface of a superabrasive compact comprises the use of electrical discharge machining (EDM) wherein a plunger having the desired pattern thereon, much like a die, is used for forming the chip breaker pattern on the surface of the compact blank. Electrical discharge machining is a method for removing material from electrically conductive substrates through a process of melting or vaporization by high-frequency electrical sparks. EDM operations are known in this art field, such as the use of an electrode wire EDM apparatus to cut conductive polycrystalline diamond compacts as proposed in U.S. Pat. No. 4,463,241. Since the compact subjected to EDM operations must be electrically conductive, some limitation on appropriate types of polycrystalline cutting blanks necessarily obtains and will be described in detail below.

While not yet evaluated, the use of ultrasonic abrading for forming chip breaker patterns on the surfaces of CBN and polycrystalline diamond compacts also seems reasonable. Other techniques for forming chip breaker patterns on the surfaces of polycrystalline diamond and CBN compacts may be evolved once the ability to form chip breaker patterns is brought to the attention of those skilled in the art by the disclosure contained herein.

With respect to the cutting blanks that can have chip breaker patterns formed thereon, compacts of polycrystalline abrasive particles typified by polycrystalline diamond and CBN compacts are well known. Such compacts are represented by U.S. Pat. Nos. 3,745,623 and 3,609,818 with respect to polycrystalline diamond compacts; and U.S. Pat. Nos. 3,767,371 and 3,743,489 with respect to polycrystalline CBN compacts. The manufacture of CBN by HP/HT processing also is typified in U.S. Pat. No. 2,947,617, a basic monocrystalline CBN case. U.S. Pat. No. 4,188,194 describes a process for making sintered polycrystalline CBN compacts which utilize pyrolytic hexagonal boron nitride in the absence of catalyst. An improvement on such direct conversion process is disclosed in U.S. Pat. No. 4,289,503.

Compacts are masses of abrasive particles bonded together in self-bonded relationship (see U.S. Pat. Nos. 3,852,078 and 3,876,751); by means of a bonding medium (see U.S. Pat. Nos. 3,136,615, 3,233,988, 3,743,489, 3,767,371, and 3,918,931); or by means of combinations thereof. Sintered CBN/cermet compacts even have been prepared by HP/HT processing techniques. The foregoing compacts are sufficiently electrically conductive that they can be subjected to plunge EDM processing for forming chip breaker patterns thereon. Of course, the use of a laser also is enabled using these compacts.

Thermally stable compacts or porous compacts comprise self-bonded diamond and CBN compacts containing less than about 3% non-diamond phase as typified in U.S. Pat. Nos. 4,224,380 and 4,228,248. Sufficient electrical conductivity may not be present in using these compacts for use of the plunge EDM technique, though use of a laser still can be practiced. Other thermally stable compacts though not "porous", include compacts described in European patent publication No. 116,403 and British patent application No. 8508295. Depending upon the second phase present in these compacts, electrical conductivity may or may not be present, as those skilled in the art will appreciate.

In this application, all percentages and proportions are by weight and all units are in the metric system, unless otherwise expressly indicated. Also, all citations referred to herein are expressly incorporated herein by reference.

We claim:

1. A method for forming a chip breaker in a polycrystalline diamond or CBN compact which comprises:
   providing an oversize compact blank having a surface and edges that establish it as oversize;
   forming a chip breaker pattern on said surface of said oversize compact blank; and
   thereafter subjecting the edges of said patterned oversize compact blank to finishing to reduce the size thereof.

2. The method of claim 1 wherein said chip breaker pattern is formed with a laser.

3. The method of claim 1 wherein said compact is electrically conductive and said chip breaker pattern is formed by electrical discharge machining.

4. The method of claim 1 wherein said chip breaker pattern is formed on an oversize polycrystalline diamond compact.

5. The method of claim 4 wherein said chip breaker pattern is formed on an oversize porous polycrystalline compact blank with a laser.

6. The method of claim 1 wherein said chip breaker pattern is formed on an oversize CBN compact blank.

* * * * *